United States Patent
Jeuschnigger

(10) Patent No.: US 12,391,476 B2
(45) Date of Patent: Aug. 19, 2025

(54) PICKING SHUTTLE AND METHOD FOR PICKING WITHIN A SHUTTLE-RACK AISLE

(71) Applicant: SSI Schäfer Automation GmbH (AT), Graz (AT)

(72) Inventor: Johann Jeuschnigger, Graz (AT)

(73) Assignee: SSI Schäfer Automation GmbH (AT), Graz (AT)

( * ) Notice: Subject to any disclaimer, the term of this patent is extended or adjusted under 35 U.S.C. 154(b) by 0 days.

(21) Appl. No.: 18/714,004

(22) PCT Filed: Nov. 9, 2022

(86) PCT No.: PCT/EP2022/081343
§ 371 (c)(1),
(2) Date: May 28, 2024

(87) PCT Pub. No.: WO2023/104420
PCT Pub. Date: Jun. 15, 2023

(65) Prior Publication Data
US 2024/0417170 A1 Dec. 19, 2024

(30) Foreign Application Priority Data
Dec. 9, 2021 (DE) ...................... 10 2021 132 413.0

(51) Int. Cl.
*B65G 1/04* (2006.01)
*B65G 1/137* (2006.01)

(52) U.S. Cl.
CPC ......... *B65G 1/0492* (2013.01); *B65G 1/1373* (2013.01)

(58) Field of Classification Search
CPC ............................ B65G 1/1373; B65G 1/0492
See application file for complete search history.

(56) References Cited

U.S. PATENT DOCUMENTS

| 10,899,539 B2 | 1/2021 | Lindbo et al. |
| 11,034,532 B2 | 6/2021 | Wehner et al. |

(Continued)

FOREIGN PATENT DOCUMENTS

| DE | 102004007412 A1 | 9/2005 |
| DE | 102016008078 A1 | 1/2018 |

(Continued)

OTHER PUBLICATIONS

International Search Report for International Application No. PCT/EP2022/081343, mailed Feb. 22, 2023.

(Continued)

*Primary Examiner* — Saul Rodriguez
*Assistant Examiner* — Willie W Berry, Jr.
(74) *Attorney, Agent, or Firm* — Jason H. Vick; Amped IP LLC

(57) ABSTRACT

It is disclosed a method for picking a product according to a picking order, which preferably belongs to a group of previously collected picking orders, by shuttles cooperating with each other in a shuttle rack storage system comprising a rack-storage block and a plurality of shuttles which are movable in a force-guided manner in a rack aisle defined between two rack rows on different rack levels, the method comprising the following steps: moving a first shuttle of the cooperating shuttles in a longitudinal direction of the rack-storage block along the rack aisle to a rack storage location in a first rack level, and subsequently (horizontally) retrieving a source container, which contains the product specified by the picking order, from the rack storage location onto the first shuttle; moving a second shuttle of the cooperating shuttles into and along the rack aisle at level of a higher second rack level (overlapping) over the previously lower-positioned first shuttle so that a gripping unit (fixedly) mounted on the second shuttle can remove the product from (Continued)

the source container positioned on the first shuttle; and delivering the product from the retrieved source container positioned on the first shuttle into a collecting container by: removing the product from the retrieved source container, which is positioned on the first shuttle, with the gripping unit of the second shuttle; and delivering the removed product to the collecting container positioned on one of the shuttles positioned lower than the second shuttle within the rack aisle (overlapping in the vertical direction), or positioned, lower than the second shuttle, at one end of the rack aisle.

22 Claims, 9 Drawing Sheets

(56) References Cited

U.S. PATENT DOCUMENTS

| | | |
|---|---|---|
| 2008/0247848 A1 | 10/2008 | Freudelsperger |
| 2015/0336741 A1 | 11/2015 | Ahammer et al. |
| 2018/0057263 A1 | 3/2018 | Beer |
| 2019/0337733 A1 | 11/2019 | Wehner et al. |
| 2020/0156871 A1* | 5/2020 | Fosnight .............. B65G 1/065 |
| 2020/0277138 A1* | 9/2020 | Elazary .............. G06Q 10/087 |
| 2021/0237973 A1* | 8/2021 | Heggebø .............. B66F 9/19 |

FOREIGN PATENT DOCUMENTS

| | | |
|---|---|---|
| EP | 3459880 A1 | 3/2019 |
| EP | 3564165 A1 | 11/2019 |
| WO | WO 2020/094336 A1 | 5/2020 |
| WO | WO 2020/094337 A1 | 5/2020 |
| WO | WO 2020/249331 A1 | 12/2020 |

OTHER PUBLICATIONS

Written Opinion for International Application No. PCT/EP2022/081343, mailed Feb. 22, 2023.
Office Action (Including Translation) for corresponding German Patent Application No. 102021132413.0, mailed Oct. 7, 2022.
Decision of Grant (Including Translation) for corresponding German Patent Application No. 102021132413.0, mailed Jan. 31, 2023.
International Preliminary Report on Patentability for International Application No. PCT/EP2022/081343, mailed Jun. 20, 2024.

* cited by examiner storage and picking system 10 warehouse 12 shuttle-rack storage system 30 picking station 14 conveyor system 16 goods receipt 18 goods issue 20 controlling device 22 material-flow computer 24 warehouse-management computer 26 order-processing computer 28

Fig. 1 shuttle-rack storage system 30
- rack-storage block 32
  - rack row 40
    - rack level 44
      - rack-storage locations 46
  - rack aisle 42
- shuttle 34
- vertical conveyor 36
- controlling module 38
- source container 48

Fig. 2

PICKING SHUTTLE AND METHOD FOR PICKING WITHIN A SHUTTLE-RACK AISLE

CROSS-REFERENCE TO RELATED APPLICATIONS

This application is a national stage application under 35 U.S.C. 371 of PCT Application No. PCT/EP2022/081343 having an international filing date of 9 Nov. 2022, which designated the United States, which PCT application claimed the benefit of German Application No. 10 2021 132 413.0, filed 9 Dec. 2021, each of which are incorporated herein by reference in their entirety.

BACKGROUND

The present disclosure relates to a method for picking a product in accordance with a picking order by means of shuttles, which cooperate with each other, in a rack aisle of a shuttle-rack storage system, and a shuttle-rack storage system suitable for this.

The patent document WO 2020/094 336 A1 relates to an automated storage system where storage containers, or source containers, are stacked vertically on top of each other (Autostore™-Konzept) for storage in vertical shafts in a grid-like rack framework. In general, rail-guided driverless vehicles are provided on the horizontal-oriented top side (cover) of the storage, which vehicles are used as storage and retrieval devices for vertically storing and retrieving the container (stacks). In particular, several vehicles can be operated as a team for removing stored products in a cooperating manner from the stored source containers and transferring the same into a carried-along collection container, or target container. A team includes at least two vehicles which are (horizontally) connected to each other through a linkage. A gripping unit is attached horizontally movable to the linkage for moving removed products into the target container carried by one of the cooperating vehicles. The gripping unit includes a vertically movable manipulator for removing stored products from stored source containers, and transferring the same into a target container (picking process), cf. FIG. 7. For the removal of products, the vehicles are connected to each other rigidly and permanently via the linkage.

As an alternative to the team, the patent document WO 2020/094 337 A1 describes in the same storage concept (Autostore™) one single vehicle, which alone can retrieve, by its gripping unit, stored products from stored source containers and deliver the same into the carried-along target container, cf. FIG. 8.

The patent document WO 2020/249 331 A1 discloses, as an additional alternative in the same storage concept, a stationary picking station arranged, like the vehicles, on top of the storage grid. In the area of the picking station the vehicles serve retrieved source containers for removal of products. A different vehicle transports the target container to the picking station, which is provided with a gripping unit. Source and target containers are positioned, by the vehicles, within an action radius of the gripping unit allowing removal and delivery (i.e. picking). The base, or one of the sidewalls, of the target container can be provided with one or more pivotally supported flaps for automatically delivering collected products (actively by means of a drive) laterally or (passively due to the gravitational force) vertically. The picking process itself is performed in accordance with the Product-to-Machine/Human-principle (PtM-principle), i.e. both the source containers and target containers are brought to the location where they meet for performing the removal from the source container and delivery to the target container (picking process). This principle has been designated often in the past also as the Goods-to-Man-principle (GtM-principle).

The patent document U.S. Pat. No. 10,899,539 B2 also relates to the Autostore™ concept, and describes a picking station arranged on the storage block, which also is operated in accordance with the PtM-principle, wherein a first type of vehicle for transporting the source and target containers and a second type of vehicle exist for transferring the products. The transferal of the products either takes place while the containers are carried by the first type of vehicle, or while the containers sit on a storage-location-like frame. As an alternative to the second type of vehicle, a rail-guided movable gripping robot is used which belongs spatially to the picking station.

The patent document DE 10 2016 008 078 A1 describes a different storage concept, namely a so-called shuttle-rack storage system. A shuttle-rack storage system is generally characterized by a (rack) storage block substantially formed by two rack rows having a rack aisle therebetween, wherein in the rack aisle—preferably on each rack level—one (one-level) storage and retrieval device—a so-called shuttle—is movable in a rail-guided manner.

A multi-axis gripping robot is fixedly mounted on the special shuttle of DE'078 A1 to pick products directly from the rack and deliver it into an order container, i.e. target container, Z which is carried by the shuttle on a (first) shuttle-transport location. In addition, the shuttle can comprise a (second) shuttle-putting location including a load-handling device (LHD) for receiving a storage container, i.e. source container, Q stored in the rack so that the gripping robot can remove products from the storage container, which is then placed on the shuttle, and deliver them into the target container also being placed on the shuttle. The shuttle-mounted gripping robot is a multi-axis industrial robot, which is heavy and requires a lot of space for avoiding collisions. Its weight requires reinforcement of the rack framework, in particular of the guiding rails, and its size hinders the possible uses of the shuttle, especially within the rack aisle. Due to the complex robot, often only a few or even only one single shuttle of that type serves several rack levels in parallel, which additionally requires a shuttle elevator for vertically transferring the shuttle between the levels and which makes the overall system somewhat more expensive. As an alternative to the multi-axis gripping robot a shuttle-mounted gantry robot is proposed in DE'078 A1, cf. FIG. 9. It would be desirable, from the point of view of efficiency, to have one shuttle on each rack level and to be able to eliminate the shuttle elevator.

The patent document EP 3 564 165 A1 also refers to a shuttle-rack storage system, and discloses a type of shuttle similar to the one of DE'078 A1, cf. FIG. 10, including: a shuttle-mounted multi-axis gripping robot GR; a shuttle-mounted vision system VS (e.g., CCD camera); and two receiving locations AP1 and AP2, i.e. the receiving location AP1 for temporary receipt of a source container Q stored in the rack, and a further receiving location AP2 for permanent receipt of a permanently carried-along target container Z, which is exchanged, after its filling, by a new target container Z. This arrangement of gripping robot and receiving location according to EP'165 A1 can also replace a load-handling device of a classic multi-level storage and retrieval device. But here, too, the problems already outlined above are present. In particular, the source container Q needs to be retrieved from the rack for each removal of product, and then to be stored back. Since the picking process takes place entirely in the area of the rack aisle, picking performance (picks/hour) are low. As with DE' 078 A1, also EP' 165 A1 is picking in accordance with the so-called Machine-to-Product-principle (MtP-principle), which generally results in a picking performance lower than the PtM-principle.

The patent document EP 3 459 880 A1 describes a classic AKL-storage system (AKL=automatisiertes Kleinteilelager, cf. Wikipedia), where conventional shuttles (without a gripping robot), which are operated within the rack aisle, retrieve source containers from the rack and transport the same to an end of aisle on one side of the face end of the rack, where a gripping robot, which is vertically movable across the entire height of the rack, is positioned for retrieving order-specific products from the served source containers and for delivering the removed products to a target container, which is served via a pre-zone conveying system, positioned at the foot of the rack. Alternatively, the gripping robot can also carry the target container (vertically). Here, again one operates in accordance with the PtM-principle, wherein the picking station is positioned directly adjacent to the end face of the rack block, so that the picking process is takes place automatically at the end-face sided end of rack, or end of aisle.

The patent document DE 10 2004 007 412 A1 relates, in accordance with its abstract, to a method and system for serving a rack, preferably in a picking installation, including a rack and an associated storage and retrieval device for retrieving and storing containers, tablets, or the like from and into the rack, wherein a height section of the rack, which height section includes one single rack level or several rack levels being arranged on top of each other, can be operated as an independent rack unit via at least one mechanically coupled storage and retrieval device, which is movable longitudinally. There, it is proposed to transfer the storage and retrieval device from one rack unit to different rack unit of the same rack or different rack, preferably to a different rack unit not yet possessing a storage and retrieval device of a similar type.

Therefore, it is an object of the present disclosure to provide an improved picking method and an improved shuttle-rack storage system.

This object is solved by a method for picking a product, in accordance with a picking order which preferably belongs to a group of picking orders collected before, by shuttles cooperating with each other in a shuttle-rack storage system, which includes a rack-storage block and a plurality of shuttles movable in a force-guided manner on different rack levels in a rack aisle defined between two rack rows, wherein the method comprises the steps of: moving a first shuttle of the cooperating shuttles in a longitudinal direction of the rack-storage block along the rack aisle to a rack-storage location on a first rack level, and subsequently retrieving (horizontally) one source container containing the product, which is specified by the picking order, from the rack-storage location onto the first shuttle; moving a second shuttle of the cooperating shuttles in and along the rack aisle at height of a higher second rack level (in an overlapping manner) over the previously lower positioned first shuttle so that a gripping unit, which is (fixedly) mounted on the second shuttle, can remove the product from the source container, which is meanwhile positioned on the first shuttle; and transferring the product from the retrieved source container positioned on the first shuttle into a collecting container by: removing the product from the retrieved source container, which is positioned on the first shuttle, with the gripping unit of the second shuttle; and delivering the removed product to the collecting container which is positioned on one of the shuttles positioned lower than the second shuttle within the rack aisle (overlappingly in the vertical direction), or which is positioned, lower than the second shuttle, at an end of the rack aisle.

The shuttles cooperating with each other in the rack aisle result in an increase of the efficiency of picking, in particular in mixed operation. In the mixed operation the shuttles within the rack aisle are picking and, at the same time, picking (in accordance with the PtM-principle) is performed at a picking station arranged outside the rack-storage block.

Traffic density outside the shuttle-rack storage system, in particular outside the rack-storage block, is reduced without reducing the picking performance of the cooperating shuttles and of the (external) picking station. The cooperating shuttles can be used within the rack aisle for a so-called shuttle-picking process during downtime phases, or waiting phases. In a normal PtM-picking process, all shuttles are never required simultaneously across all rack levels for storage and retrieval of the source containers so that there are always downtime phases, i.e. waiting phases, for individual shuttles, which are conventionally used, for example, for distributing the product assortment within the rack-storage block. These downtime phases are now used by the shuttles for reducing number of transferring processes which are typically performed at the location of the external picking station. In particular, this means that a source container does not need to be transported to the picking station under all circumstances, since an associated transferring process is already completed within the rack aisle. Reduction of the traffic density of the source containers (number of source containers per unit conveyor section) resulting therefrom outside the rack-storage block opens a plurality of optimization possibilities in the course of picking. For example, other source containers can be stored and retrieved earlier.

Further, in a two-stage picking process (batch picking) products having a low access frequency can be pre-picked within the rack aisle for being transported subsequently, in a collected manner, as one single transport order to the picking station where the collected products are distributed in order-oriented manner to target containers.

Preferably, the gripping unit is formed biaxially for removing and delivering the product exclusively due to movements in (vertical) height direction and (horizontal) transverse direction of the rack-storage block, and wherein in particular a movement proportion of the transferring step along the longitudinal direction is caused, by means of a controlling device, by moving at least one of the first and second shuttles.

When the gripping unit is formed biaxially (linear), the gripping unit has very small dimensions. Since the transferring processes preferably act downwards always, such a biaxial gripping unit is sufficient. The overall installation height of the shuttle is not increased by the gripping unit. This means that the pitch of the rack levels does not have to be adapted to the cooperating shuttles. An originally planned storage density remains unchanged because the shuttle is not built higher.

Movement proportions of a transferring process are not caused by the gripping unit itself, but by the shuttle, so that a third movement axis can be dispensed with.

The gripping unit itself is easy to implement due to its small number of movement axes.

In particular, the method comprises the step of: analyzing at least the picking order for products suitable for being picked by the shuttle.

Not every product that appears in a picking order is suitable for being picked by the cooperating shuttles within the rack aisle. Dependent on the picking concept used as standard, there are products that are better or worse suited for the intra-aisle picking by the cooperating shuttles. Preferably, only such products are pre-picked, or finally picked, by the cooperating shuttles within the aisle, which do not disturb, or disturb only as little as possible, the "normal" picking operation at the (external) picking station.

Preferably, the step of the above-mentioned analyzing is based on at least one of the following parameters: a respective access frequency of the products contained in the picking orders; overlapping downtime phases, i.e. waiting phases, of the first and second shuttles; and a number of stages of the picking principle practiced (one-stage, in particular parallel, picking; or two-stage picking).

Since products having a lower access frequency must be transported less frequent to the picking station, it is recommended, for reducing the (source container) traffic density, to pick the corresponding products within the rack aisle by the cooperating shuttles. In this context, in particular temporally overlapping downtime phases of the first and second shuttles can be of importance. If the first and second shuttles have nothing to do during a certain matching period of time, i.e. they are not assigned to any transport orders by the material-flow computer for supplying the (external) picking station, these shuttles can be used for the shuttle-picking process.

Further, the shuttle-picking process is particularly advantageous in the first article-oriented stage of a two-stage picking principle. In this case, the first picking stage can be performed within the rack aisle so that it is possible to perform merely the second picking stage, i.e., the order-oriented distribution of the products collected before, at the picking station.

Further, it is advantageous if the shuttle-rack storage system supplies a picking station outside the rack-storage block with source containers for picking in accordance with the PtM-principle, and if the products suitable for shuttle-picking, which in particular are products having a low access frequency, are pre-picked, or are finally picked, by the cooperating shuttles within the rack aisle at the same time.

In this context, the material flow is preferably planned such that the picking of the products suitable for shuttle-picking is performed such that the supply of the picking station with the source containers, which are retrieved from the rack-storage block, occurs trouble-free. In this context, trouble-free means that transport orders for the source containers, which are (normally) transported to the picking station, do not collide with transport orders to be executed by the cooperating shuttles. With other words, the transport orders and supply orders of the picking station are handled prioritized in comparison with such ones required for the shuttle-picking process within the rack aisle.

Preferably, the step of delivering is vertical dropping of the removed product.

For delivering the removed product to the collecting container, the gripping unit is not operated actively. The removed product is transferred to the collecting container positioned below by the gravitational force. This type of delivering saves energy.

However, this type of delivery requires that the removed product is not damaged upon impacting on the collecting container. Hence, in this context, a dropping height plays a role, which is proportional to the energy. Since the delivery of the removed product, however, typically occurs in the region of two directly adjacent rack levels, even if a so-called dropping tower is used, this manner of delivery is applicable to a predominant portion of a range of article, in particular in the field of e-commerce.

In particular, the product(s) to be delivered to the collecting container, in particular in case of a two-stage picking process, are transported to a picking station outside the rack-storage block.

The first stage, i.e. the product-type oriented collecting of products, is performed directly in the rack, so that the transport paths of the associated source containers are reduced extremely. Thus, not all the source containers need to be transported to the picking station so that the (source container) traffic density outside the rack-storage block is reduced, and thus the opportunity for further optimizations opens.

Further, it is preferred to either empty or exchange (within the rack-storage block) the collecting container positioned on one of the shuttles, after each of the products determined by the picking order(s) has been delivered to the collecting container.

The cooperating shuttles do not need to exit the rack aisle for transferring the collected products. The collected products are moved either by means of an exchangeable collecting container, or in any other transport container, or directly on a conveyor to the picking station, or in particular directly to a goods-issue area, or are transferred within the rack-storage block to a corresponding transport container (for being forwarded to the picking station) or an order container (for being shipped from the goods-issue area).

Moreover, the object is solved by a shuttle-rack storage system comprising: a rack-storage block including a rack aisle arranged between two rack rows; and a plurality of shuttles, which cooperate with each other, including at least a first shuttle and a second shuttle, which are provided on different rack levels and are operated (only) in the rack aisle; wherein the first shuttle is operated at height of a first one of the rack levels; wherein the second shuttle is operated at height of a second one of the rack levels being arranged higher, and in particular directly, above the first rack level; and wherein at least the second shuttle, and preferably each of the shuttles, is provided with a biaxial gripping unit configured to remove a product from a source container positioned temporarily on the first shuttle, and deliver it to a collecting container positioned lower than the second shuttle by lifting the product only vertically, by the gripping unit, and, if necessary, also lowering it and displacing the removed product horizontally transverse to a longitudinal direction of the rack aisle.

Due to the integration of the gripping unit into the corresponding shuttle of the cooperating shuttles, the overall installation height is not increased. Therefore, the pitch of the rack levels is not affected. The storage density does not change, as already explained above.

Existing shuttle-rack storage installations can be retrofitted, by retrofitting some or all of the existing shuttles with a corresponding gripping unit. This allows performance of the above-described method in existing installations which originally have not been configured for the intra-aisle shuttle-picking process.

The gripping unit is compact and simple in design due to its two axes. The movement sequences are simple and easy to coordinate. Collision with the rack rows is excluded since the gripping unit cannot be moved into the rack rows.

By accommodating the technically simple gripping unit, also the overall weight of the shuttle remains unchanged compared to the accommodation of a robot having five or six axes. The structure of the racks does not need to be reinforced since the weight of the shuttles substantially is not increased.

Preferably, the shuttles are moved in the rack aisle along rails in a force-guided manner, which extend along the longitudinal direction, which are orientated in the longitudinal direction, and which are connected to the rack rows.

In particular, each of the shuttles is a one-level storage and retrieval device.

Preferably, at least some, and preferably all, of the source containers comprise a compartment partition so that products can be stored in vertically oriented stack of products, by one type only at fixedly determined positions within the corresponding source containers.

The compartment partitions allow location-accurate positioning of the products within the source containers so that the cooperating shuttles do not require any vision system (e.g., camera). The removal of the product from the source container, which is located on the lower one of the cooperating shuttles, can occur without image recognition, i.e. based solely on the product master data. The higher-level controlling device is aware of the respective storage location of the product as well as of a current height of the product stack for driving the gripping unit corresponding to the removal of the current highest product of the corresponding product stack.

Preferably, the products are supported on all sides by the compartment partitions, so that the products within one product stack are always oriented identically. Thus, chaotic product distribution and orientation within the source container is excluded, so that image generation and image processing for the purpose of determining position and orientation of the products within the source container can be eliminated.

Alternatively, each gripping unit can be provided with a vision system. In this case, the products may be chaotically distributed within the source container, since the removal process can be performed in real time based on an image processing determining a respective position and orientation of the products within the source container.

Further, it is advantageous if each of the gripping units is positioned and attached in a longitudinal end section of the corresponding shuttle such that shuttle height without any loaded source container is less than with a loaded source container.

Thus, the gripping unit does not increase the overall installation height of the shuttle.

Further, a shuttle-rack storage system is proposed which is configured to perform the above-explained method. Thus, the corresponding shuttle-rack storage system is provided with a controlling device configured for performing the above-explained method.

Further, a storage and picking system is proposed which comprises such a controlling device and the above-described shuttle-rack storage system.

It is understood that the above-mentioned and hereinafter still to be explained features cannot be used in the respectively given combination only, but also in different combinations or alone without departing from the scope of the present disclosure.

BRIEF DESCRIPTION OF THE DRAWINGS

Embodiments of the disclosure are illustrated in the drawings and will be explained in more detail in the following description, wherein:

FIG. 1 shows a block diagram of a storage and picking system;

FIG. 2 shows a block diagram of a shuttle-rack storage system;

DETAILED DESCRIPTION

Figure 3A:
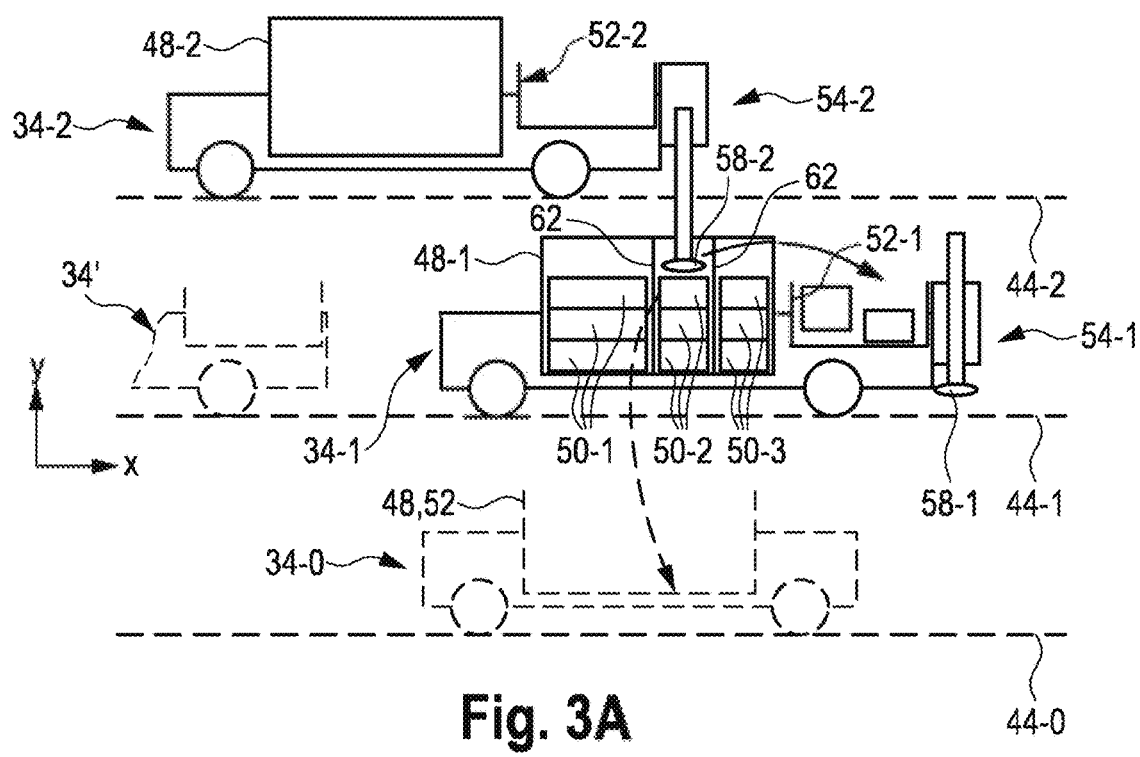
FIG. 3 shows a side view (FIG. 3A) and a top view (FIG. 3B) of shuttles cooperating with each other.

The automated system proposed here is in particular used in storage and picking systems in intralogistics, and preferably serves as a warehouse for picking products in the field of e-commerce, e-grocery, micro-fulfillment centers, or the like.

In general, intralogistics include logistical flows of material and good that take place within a company premises, in particular within a company building. The term intralogistics was defined in order to distinguish it from the transportation of goods outside the company premises, for example, by a freight forwarder between two company premises. The term intralogistics is defined as the organization, control, performance, and optimization of the inhouse flow of goods (e.g., products in distribution and shipping) and the flow of material (e.g., pre-products, intermediate products, and final products in production), of information streams as well as of goods and material handling in the industry and in the retail. In the following, the term material flow will be used for simplification, even if products are actually transported.

FIG. 1 shows a block diagram of a storage and picking system 10. The storage and picking system 10 comprises a warehouse 12, at least one picking station 14, and a conveyor system 16. The conveyor system 16 connects the warehouse 12 to the picking station 14 in terms of the material flow. The conveyor system 16 can further connect, in terms of the material flow, a goods receipt 18 and/or a goods issue 20 of the system 10 to each other and to the warehouse 12 and picking station 14. The conveyor system 16 can include continuous conveyors (such as roller conveyors, belt conveyors, chain conveyors, overhead conveyors, etc.) and/or discontinuous conveyors (such as driverless transport vehicles, storage and retrieval devices, elevators, etc.).

Further, the storage and picking system 10 comprises a controlling device 22, which can include a material-flow computer 24, a warehouse-management computer 26, and/or an order-processing computer 28. The material flow, the warehouse management (storage-location management, inventory data, etc.) and/or the order processing (such as assignment and distribution of tasks for processing a picking order) can alternatively be performed also in a de-centralized manner in a distributed data-processing system.

The warehouse 12 includes a shuttle-rack storage system 30. The shuttle-rack storage system 30 is schematically illustrated in the block diagram of FIG. 2. The shuttle-rack storage system 30 includes at least one rack-storage block 32, a plurality of shuttles 34, and at least one vertical conveyor 36. Dependent on the architecture of the controlling device 22 (FIG. 1), the shuttle-rack storage system 30 optionally comprises also one or more controlling modules 38, which are preferably part of the controlling device 22.

The rack-storage block 32 is defined by at least two rack rows 40 arranged (in a transverse direction Z) spaced apart to each other for forming a rack aisle 42 therebetween.

In each rack row 44 a plurality of rack-storage locations 46 are arranged horizontally and vertically next to each other, and are oriented along a longitudinal direction X and a height direction Y of the system 30. The rack rows 40 and the rack aisle 42 extend substantially along the longitudinal direction X of the rack-storage block 32, and are oriented along the longitudinal direction X. Each of the rack rows 40 is vertically distributed into several rack levels 44 (preferably with an identical pitch).

The rack levels 44 are arranged vertically on top of each other in a height direction Y of the system 30. Each of the rack levels 44 comprises rack-storage locations 46 arranged horizontally next to each other.

The rack-storage locations 46 are served (in the transverse direction Z of the system 30) by the shuttles 34 for storing and retrieving source containers, i.e. storage containers, 48 configured for the storage of products 50 to be picked. Preferably, the shuttles 34 are one-level storage and retrieval devices, so that at least one shuttle 34, which serves the rack-storage locations 46 on the corresponding rack level 44, is provided at a height of each of the rack levels 44 in the rack aisle 42. The shuttles 34 are configured to travel in a force-guided manner along rails 51 (cf. FIGS. 3B and 4B), which are preferably attached laterally to the rack rows 40, in the longitudinal direction X within the aisle 42. The shuttles 34 respectively comprise a load-handling device configured to store and retrieve the source containers 48 in the transverse direction Z in the rack-storage locations 46. The directions X, Y, and Z define a Cartesian coordinate system.

The vertical conveyors 36 are configured to transfer the source containers 48 and/or the shuttles 34 in the vertical height direction Y. Several vertical conveyors 36 can be provided for each rack-storage block 32. The vertical conveyors 36 can be arranged in a rack-integrated manner, or outside the rack rows 40 in extension thereof, or within the rack aisle 42. Preferably, the vertical conveyors 36 are arranged adjacent to a face end of the rack rows 40 in the extension thereof.

FIG. 3 illustrates an interaction between cooperating shuttles 34, in particular between the two shuttles 34-1 and 34-2. FIG. 3 illustrates a shuttle-picking process (removal and delivery) of a product 50 within a rack aisle 42 of the shuttle-rack storage system 30, wherein, for example, at least one of the shuttles 34 is arranged on each rack level 44. The shuttles 34 are preferably implemented by one-level storage and retrieval devices, which do not comprise any lifting functionality and thus are only used on its the rack level 44 for storing and retrieving source containers (e.g. storage containers) 48. The basic structure of the shuttles 34 is known. The shuttles 34 are preferably configured for receiving one (single) storage container 48, and are provided with a corresponding load-handling device.

The FIG. 3A shows a lateral view of, for example, three rack levels 44-0 to 44-2 in detail, which are arranged vertically on top of each other and directly (i.e. without any further functional elements, such as a storage/retrieval level between) adjacent to each other. The rack level 44-1 is arranged directly below the rack level 44-2 arranged above. The rack level 44-1 is arranged above the rack level 44-0, which is illustrated, for example, in a lowest rack level. It is understood that more rack levels 44 may be provided. For performing the shuttle-picking process, at least two rack levels 44 are required, which may also be spaced vertically to each other farther than a standard rack pitch.

In FIG. 3 a first shuttle 34-1 is operated at the height of the first rack level 44-1 for storing and retrieving the source containers 48 in the transverse direction Z there. A second shuttle 34-2 is operated at the height of the second rack level 44-2. In the lowest rack level 44-0 also one shuttle 34-0 is indicated by a dashed line. It is understood that several shuttles 34 can operate one (single) rack level 44 at the same time, cf. rack level 44-1 in FIG. 3, where a further shuttle 34' is indicated to the left-hand side of the shuttle 34-1 by means of dashed lines, for example. Preferably, however, always merely one shuttle 34 is used on each rack level 44.

Figure 3B:
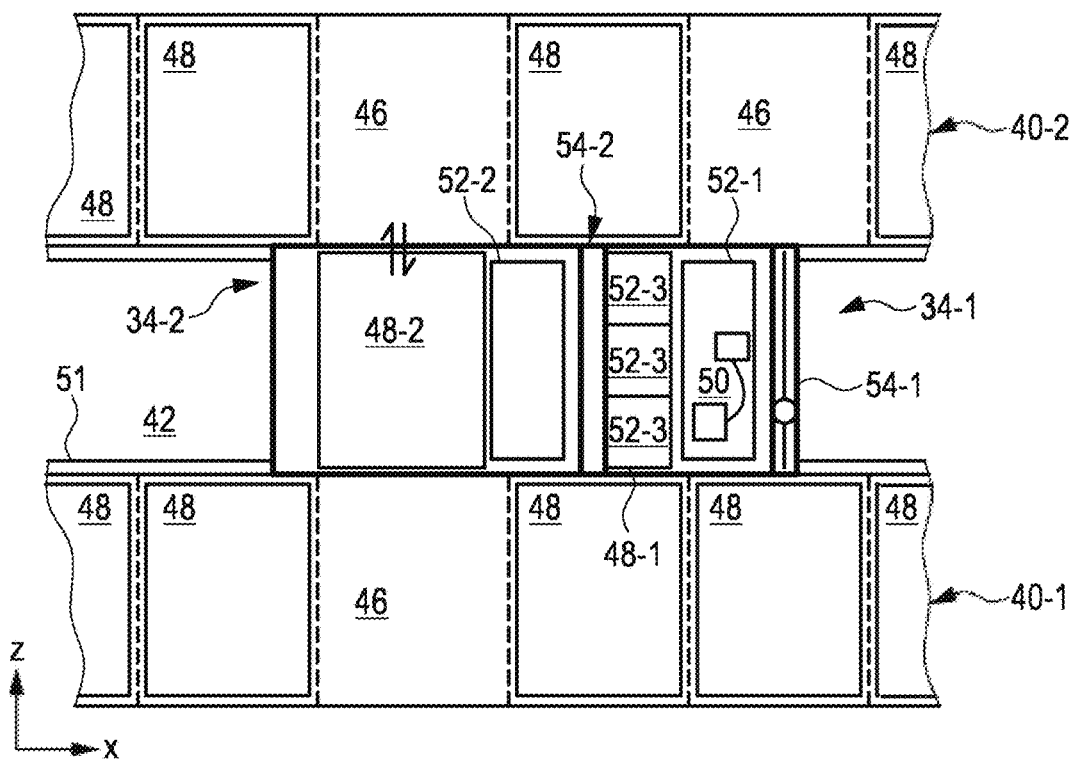

In general, the shuttles 34 travel in the longitudinal direction X in a force-guided manner, for example, on rails 51, cf. FIG. 3B showing a top view of FIG. 3A. At the height of each of the rack levels 44, the rack-storage locations 46 are arranged horizontally next to each other for storing and retrieving the source containers 48 in the transverse direction Z. Each of the shuttles 34 is generally configured to receive at least one of the source containers 48 and to bring it to a (container) vertical conveyor 36 which is not shown here. In FIG. 3 the shuttle 34-1 carries the source container 48-1, which is filled with different products 50-1 to 50-3 (in a compartment-partitioned manner).

It is understood that the source containers 48 are preferably loaded with products of one type only. Also, the source container 48-1 is loaded with one type only, since in each compartment products 50 only one product type is provided. The source container 48-2, which is carried by the second shuttle 34-2, is illustrated empty, for example.

Further, each of the shuttles 34 is generally configured to carry, i.e. receive, a collecting container 52, and transport it through the rack aisle 42. Products 50 are collected in the collecting containers 52, which are transferred by a different, preferably higher positioned, shuttle 34 (in accordance with a picking order). The collecting containers 52 are preferably dimensioned slightly smaller than the source containers 48, wherein a length dimension in the transverse direction Z preferably is identical to the one of the source containers 48 (and the shuttles 34). Preferably, the collecting containers 52 have a base surface which is not used on a top side of an (ordinary) shuttle 34, i.e. free for receiving the collecting container. The collecting containers 52 can be fixedly positioned on the shuttles 34, i.e. they do not need to be exchangeable in this case.

However, the collecting containers 52 can also be positioned on the shuttle 34 in an exchangeable manner. Corresponding collecting-container exchange stations (not shown) can be arranged on each rack level 44, for example, instead of one or more rack-storage locations 46.

Preferably, each of the shuttles 34 carries one single collecting container 52. According to a modification, which is not illustrated here, the shuttles 34, however, can also receive more of the collecting containers 52 at the same time.

Further, it is understood that the collecting containers 52 can also be realized by a source container 48, so that the shuttles do not require an additional collecting container 52. This means that in this case the receiving shuttle 34 does not carry two containers 48 and 52, but merely one single container 48 which in this case serves as the collecting container 52. However, the embodiment is preferred with which the shuttles 34 can carry at least one source container 48 and at least one collecting container 52 provided separately.

Further collecting containers 52' can be positioned alternatively and additionally in the rack aisle 42, as it will be explained in more detail with reference to FIG. 4.

In FIG. 3 the collecting container 52-1 of the first shuttle 34-1 is already loaded, for example, with two products 50 which have been transferred by, for example, the shuttle 34-2. The collecting container 52-2 of the second shuttle 34-2 is (still) empty and may be loaded by a shuttle 34 above the rack level 44-2.

Further, each of the shuttles 34 preferably comprises a gripping unit 54. At least the shuttles 34 above the lowest rack level 44-0 respectively comprise at least one gripping unit 54. Each of the gripping units 54 includes a drive 56, which is not illustrated here, for moving a gripper, i.e. manipulator, 58 at least (linear) vertically in the height direction Y and (linear) horizontally in the transverse direction Z.

The gripping units 54 are preferably configured for biaxial operation. The gripping units 54 may be configured to act downwards only, i.e. lifting functionality over their respective individual rack level 44 is not provided in this case. The gripping units 54 may include, for example, corresponding spindle drives.

Preferably, the gripping units 54 are arranged in an end section of the shuttles 34 along the longitudinal direction X. The gripping units 54 can be retrofitted to conventional shuttles 34 of an existing installation.

In FIG. 3 an exemplary situation is shown in which the gripper 58-2 of the second shuttle 34-2 reaches into the source container 48-1 for picking one of the products 50-2, which is required by a picking order, and transferring it into the collecting container 52-1 of the first shuttle 34-1, which has been assigned to this picking order (by the order-processing computer 28) in advance. The coordination of the required movements of the containers 48 and 52 as well as of the shuttles 54 was determined in advance, for example, by the material-flow computer 24. Thus, the picking process of a product 50 specified by a picking order is performed within the rack aisle 42 by mutual cooperation of at least two of the shuttles 34.

In the example of FIG. 3 (and preferably also in general) the cooperating shuttles 34-1 and 34-2 are moved relative to each other in the longitudinal direction X of the aisle 42 so that the gripping unit 54-2 of the higher-arranged shuttle 34-2 is movable into the source container 48 of the lower-arranged shuttle 34-1, in particular by a simple lowering, cf. FIG. 3B.

As soon as the corresponding gripper, or manipulator, 58 has picked the desired product 50 in the source container 48 and lifted it at least slightly, at least one of the involved shuttles 34, preferably both shuttles 34, can be displaced in the longitudinal direction X such that the gripping unit 54, which is static in the longitudinal direction X, of the upper shuttle 34-2 is positioned vertically direct over the collecting container 52-1 of the lower-positioned shuttle 34-1 and the retrieved (and still grabbed) product 50 can be delivered vertically into the collecting container 52 of the lower shuttle 34. The delivery occurs either by actively lowering the gripper 58, or alternatively by dropping the picked product 50.

The width of the collecting container 52 in the transverse direction Z extends preferably over the entire width of the shuttle 34 and is, in particular, adapted to the width of the gripping unit 54.

It is understood that also more than two shuttles 34 can cooperate with each other during the picking process. For example, it is possible that the highest shuttle 34, such as the shuttle 34-2, of a group of shuttles 34 performs the gripping process, while a lower arranged shuttle 34, such as the shuttle 34-1, provides the corresponding source container 48 and a still lower arranged shuttle 34, such as the shuttle 34-0, provides the corresponding collecting container 52, cf. FIG. 3A, where the collecting container 52 is implemented, for example, by an empty source container 48.

In this context, both of the shuttles 34 being arranged lower than the picking shuttle 34 can also be arranged on the same rack level 44, cf., for example, the shuttles 34-1 and 34' in FIG. 3A. These shuttles 34 are moved in the longitudinal direction X, as described above, after the pick of the corresponding product 50 for positioning the collecting container beneath the picking shuttle 34.

It represents a structural advantage if, during all transferring processes, only movements in the vertical direction Y and transverse direction Z are performed by the gripping unit 54. In this case, the gripping unit includes only two axes and can be operated easier, and is lighter. Movement proportions in the longitudinal direction X are accomplished by travel of the corresponding shuttles 34. The transferring process preferably occurs exclusively beneath the picking shuttle 34, the gripping unit 54 of which performs the transferring process.

For achieving the conceptional advantage of the picking process within the rack aisle 42—compared to a picking process at the picking station 14 outside the rack-storage block 32—also, however, a multi-axis gripping unit 54 may be used. This conceptional advantage will be explained in more detail below.

It is understood that in general each of the gripping units 54 can be provided with a camera system 60 (not shown) for coordinating and observing the transfer process. Based on the correspondingly generated images, a position of the to-be-removed product 50 within the source container 48 can be determined in real time by means of image processing. Further, the transfer process can be observed as such. Finally, the deposition location with the collection container 52 can be determined and monitored correspondingly.

The gripping unit 54-2 of the shuttle 34-2 in the example of FIG. 3 does not require such a camera system 60, because the source container 48-1 is partitioned into compartments. The source container 48-1 comprises compartment partitions 62 in its interior for providing the products 50-1 to 50-3 in product stacks stacked vertically on top of each other. The compartment partitions 62 are preferably oriented perpendicular and define predetermined spaces, which are adapted, for example, to the dimensions of the respective products 50. Thus, a retrieval position is clear in advance. The retrieval location in the XZ-plane is fixedly predetermined. The retrieval height results from, for example, the inventory data of the corresponding source container 48-1, which data is currently stored in the warehouse-management computer 26, for example. This means that the controlling device 22, and in particular the warehouse-management computer 26, tracks the number of the products 50 (still) existing in the corresponding container compartment. Further, the dimensions of the corresponding product 50 are retrievable from the master data for determining the removal height based on the respective number of the products 50 remaining in the product stack. Further, the compartment partitions of the source containers 48 can be recorded in the master data, so that the shuttles 34-1 and 34-2, which are cooperating with each other, can travel in the longitudinal direction X correspondingly on top of each other, and the gripping unit 54-2 only needs to move in the transverse direction Z over the corresponding product stack for removing the product 50 specified by the picking order and the transferring order. In the example of FIG. 3 this is, for example, the product 50-2.

FIG. 4 shows a modification of the configuration of the shuttles 34 with regard to a relative positioning of the collecting container 52. The collecting container 52 is arranged on the shuttles 34 of FIG. 4 in an end section of the corresponding shuttle 34. Preferably, the collecting container 52 is arranged in an end section, which is opposite to the end section where the respective gripping unit 54 is positioned.

Figure 4A:
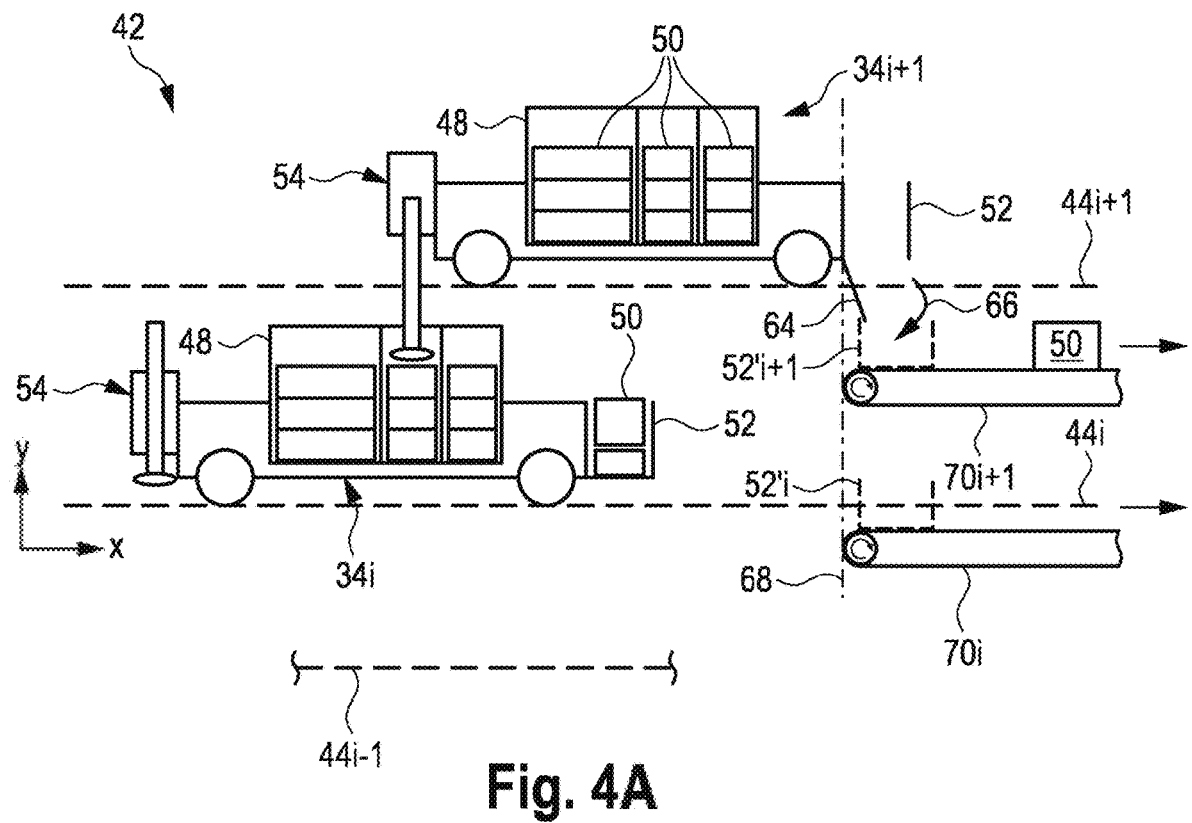
FIG. 4 shows a side view (FIG. 4A) and a top view (FIG. 4B) of cooperating shuttles which automatically empty its collecting containers.

The collecting container 52 of FIG. 4 can be provided with a movably supported base 64. In FIG. 4, the base 64 is pivotable about a horizontally-oriented pivot axis extending, for example, parallel to the transverse direction Z. An opening movement 66 of the base 64 is illustrated by an arrow in FIG. 4A for the upper shuttle 34$i$+1.

At one end 68 of the aisle (see dotted line in FIGS. 4A and 4B) one or more conveyors, in particular continuous conveyors 70, of the conveyor system 16 can be arranged for receiving collected products 50 and transporting the same to one of the picking stations 14. The continuous conveyor 70 can be implemented, for example, by a belt conveyor. The continuous conveyor 70 of FIG. 4 is arranged lower than a traveling plane (rack level 44$i$+1 of the upper shuttle 34$i$+1), so that the collected products 50 can be delivered (passively) by the gravitational force from the collecting container 52.

Figure 4B:
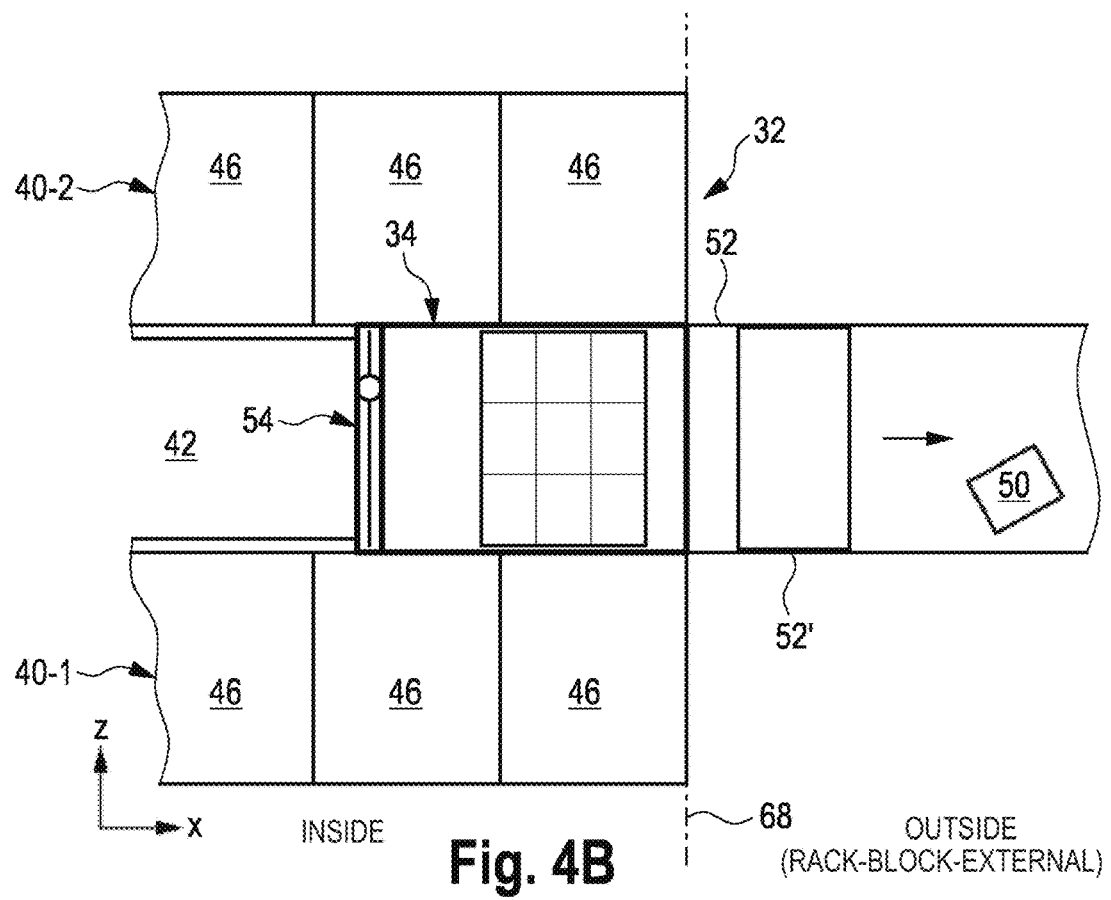

The continuous conveyors 70 of FIG. 4 is arranged, for example, outside the rack-storage block 32; however, it may also extend into the rack aisle 42. The shuttle 34 of FIG. 4 can travel in the longitudinal direction X so far that the collected products 50, upon opening the base 64, fall onto the corresponding continuous conveyor 70, cf. FIG. 4B.

It is understood that each of the rack levels 44 may be equipped with a corresponding (external) continuous conveyor 70. Preferably, however, a discharging conveyor is provided only on the lowest rack level 40, which is formed, for example, by a tower of inclined slides arranged in cascade, in order to connect each of the rack levels 44 vertically.

Figure 5A:
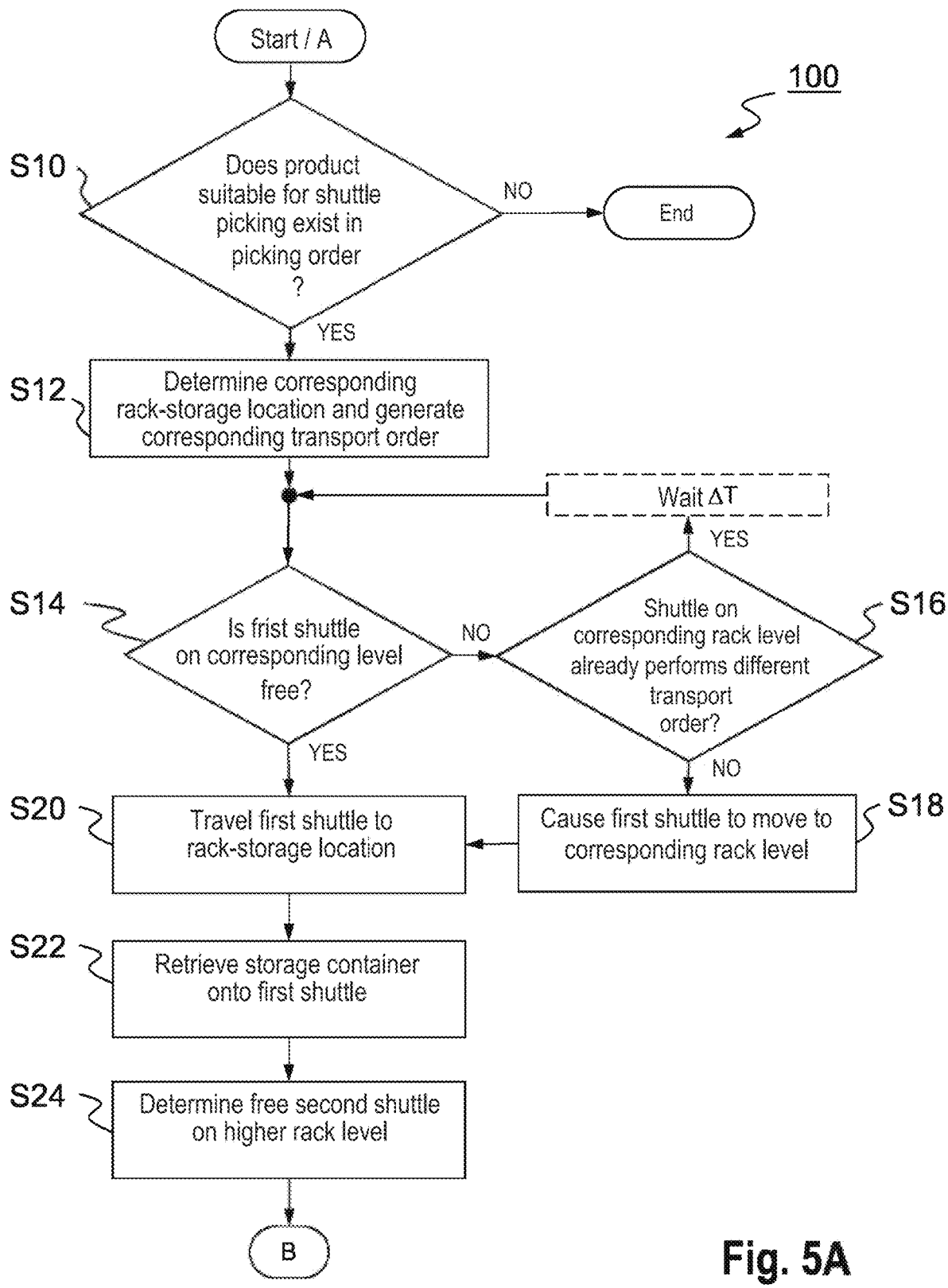
FIGS. 5A and 5B show a flow chart for performing a shuttle-picking process.
Figure 5B:
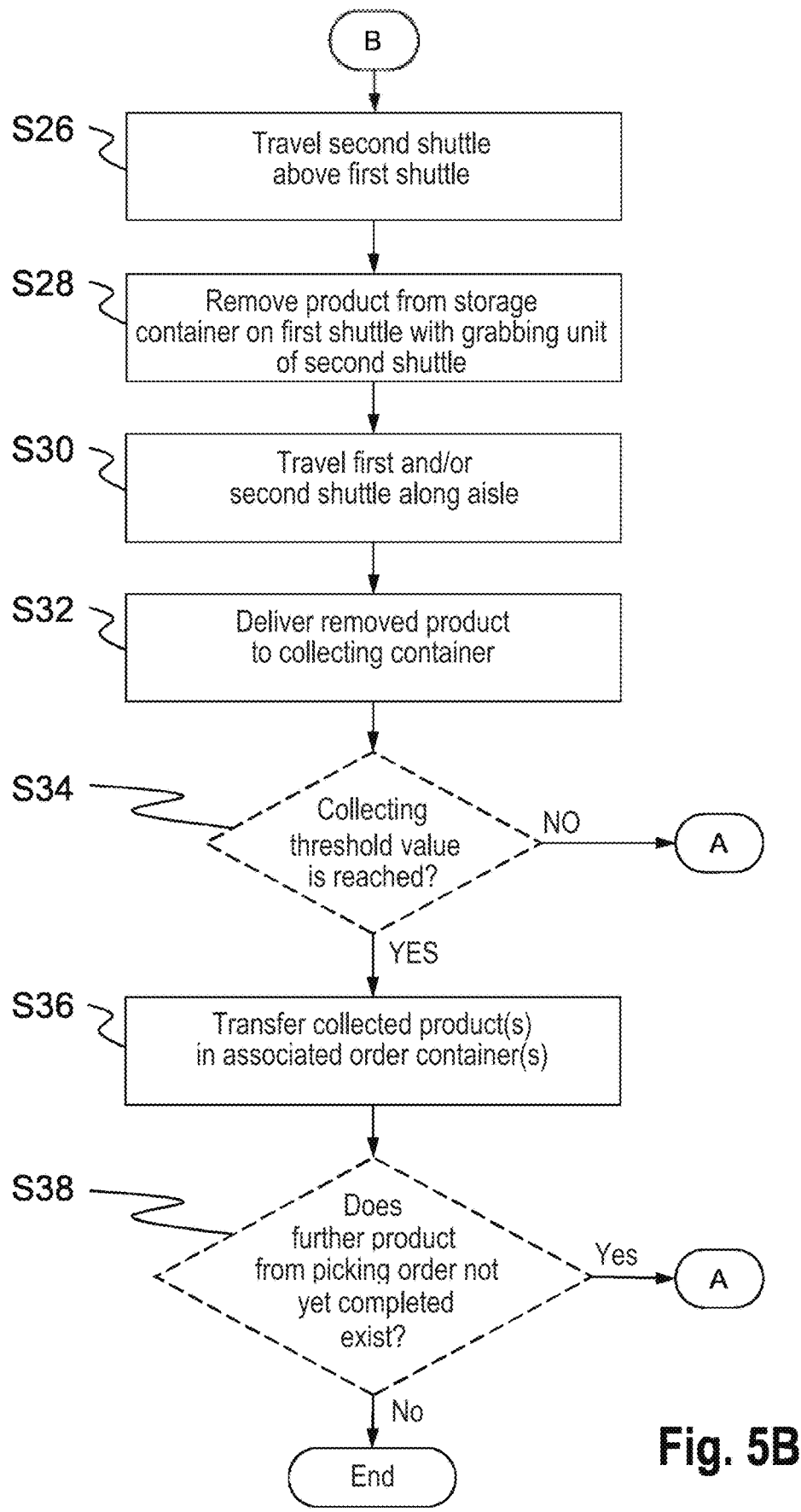

FIG. 5 shows a flow chart 100 relating to a (pre) picking process of products 50 in accordance with one or more picking orders by means of cooperating shuttles 34 within a shuttle-rack storage system 30. The (pre) picking process is performed within the rack aisle 42 in which several shuttles 34, however at least two of the shuttles 34, cooperate with each other, as it was described already before in FIGS. 3 and 4. The following description of the picking process is of general nature, and thus independent of the structural configuration of the system 30, and in particular independent of the configuration of the gripping unit 54.

In step S10 the controlling device 22 queries if there is a product 50, suitable for shuttle-picking, in one or more picking orders. As it will be described in more detail below, a product 50 "suitable for shuttle-picking" is a product 50 which is picked—in view of an increase of the picking performance (number of transferred products per unit of time) of the overall system 30—by means of the shuttles 34 preferably within the rack-storage block 32 instead of at the picking station 14 (in accordance with the PtM-principle), which is arranged outside the rack-storage block 32, i.e. externally, and which is connected to the rack-storage block 32 through the conveyor system 16.

In this case, these are often products 50 with a lower access frequency. The access frequency is a key figure that indicates how often a product 50 occurs on average in a picking order. In this context, one often speaks of an ABC distribution of products 50, wherein products 50 of the category A have a very high access frequency, products of the category B have a medium access frequency, and products of the category C have a (very) low access frequency. Often, the products 50 suitable for shuttle-picking are C-products.

However, also products 50 of an access frequency different than "suitable for shuttle-picking" may be classified, as it will be explained hereinafter in more detail. Also, different characteristics of the products 50, which also may be caused by the associated picking order, may result in a classification "suitable for shuttle-picking", as will be explained in more detail below.

If there are no products 50 suitable for shuttle-picking in the picking orders currently being processed, the method 100 ends. Otherwise, in step S12, a corresponding rack-storage location 46 is determined, where the product 50 suitable for shuttle-picking is stored in a source container 48, for example, by directing a corresponding query to the warehouse-management computer 26. The evaluation of the step S10, whether a product 50 suitable for shuttle-picking is present, can be conducted by the order-processing computer 28 of the controlling device 22.

In general, the source containers 48 can be implemented by boxes, containers, cartons, trays, and the like.

Further, the controlling device 22, and in particular the material-flow computer 24, can generate a corresponding transport order for retrieving the source container 48, which contains the corresponding product 50, onto a shuttle 34 on the corresponding rack level 44 including the associated rack-storage location 46. Thus, in the step S12 not only the rack-storage location 46 is determined, but also the corresponding rack level 44.

In step S14 the controlling device 22 can query whether a shuttle 34 on the corresponding rack level 44 is free. The shuttle 34 on this rack level 44 is free, if the shuttle 34 has not been assigned earlier to a different transport order or if the shuttle 34 is currently not performed any (different) transport order.

If it is determined in the query of the step S14 that any shuttle 34 at the corresponding rack level 44 is free, in step S16 it can be queried whether the shuttle 34 on the corresponding rack level 44 is already carrying out another transport order. If the shuttle 34 performs another transport order, one waits a period of time $\Delta T$ until the shuttle 34 on the corresponding rack level 44 is free. However, if the query in the step S16 results in that no other transport order is performed on the corresponding rack level 44 either, this means that on the corresponding rack level 44 no shuttle 34 is present at all. In this case, in step S18 the controlling device causes a free shuttle 34 to be moved to the corresponding rack level 44.

In step S20 the correspondingly determined free (first) shuttle 34, such as the shuttle 34-1 in FIG. 3, is then moved to the corresponding rack-storage location 46 in the longitudinal direction X for receiving there, by means of its load-handling device, the source container 48 containing the product 50 suitable for shuttle-picking. In step S22 the corresponding source container, or storage container, 48 is retrieved onto the first shuttle 34.

In step S24 of FIG. 5 the controlling device 22 determines a further free (second) shuttle 34, such as the shuttle 34-2 in FIG. 3, on a higher rack level 44 for transferring the desired product 50 of the source container 48 from the first shuttle 34 into a collecting container 52. It is understood that the step S24 can be performed alternatively at the same time as the step S12, or directly after the step S12 and before the step S14.

The second shuttle 34, which is also arranged on a higher-located rack level 44, then travels in step S26 in the longitudinal direction X (vertically) above the first shuttle 34, cf. FIG. 3B, for example. This means that the second shuttle 34 in top view overlaps the first shuttle 34 such that the gripping unit 54 of the second shuttle can remove the product 50 from the source container 48 on the first shuttle 34. The second shuttle 34 is arranged on a rack level 44 which is arranged, preferably directly, above the rack level of the first shuttle 34.

Then, in a further step S28 the product 50 is removed from the storage container 48 on the first shuttle 34 by means of the gripping unit 54 of the second shuttle 34, for example, by lowering the gripper 58 vertically until being in contact with the product 50 to be removed. The gripper 58 can be formed, for example, by a suction device or a multifinger manipulator.

While the gripping unit 54 of the second shuttle 34-2 holds the product 50, the second shuttle 34-2 is preferably moved in the longitudinal direction X such that the held product 50 can be delivered to, or thrown into, the collecting container 52. Typically, the collecting container 52 is placed on the first shuttle 34-1 in the lower-located rack level 44. Alternatively, the second shuttle 34-2 can travel, for example, to the end 68 of aisle for delivering the removed product 50 to a continuous conveyor 70, which in this case can have the functionality of a collecting container 52, cf. reference numeral 52'$i$+1 in FIG. 4A, which does not have to be physically present. In this manner, several (different) products 50, in particular within a predefined area (virtual collecting container 52') can be collected on the continuous conveyors 70, before the continuous conveyor 70 is operated, in order to transport the collected products 50 to the picking station 14. The delivery of the removed product 50 to the collecting container 52 or 52', takes place in step S32 of FIG. 5.

Optionally, in step S34 a query can follow to the delivery step S32. In the step S34 it can be queried whether a collecting threshold has been reached. The collecting threshold can be defined by, for example, a number of collected products 50, a temporal collecting period, a storage capacity of the collecting container 52, and the like. The collecting threshold is set by the controlling device 22.

If the collecting threshold has not yet been reached in the step S34, the method 100 returns to the step S10. Otherwise, the method proceeds to step S36.

In the step S36 the product(s) 50 delivered to the collecting container 52 are transferred to the associated target container(s), or order container(s). This means that the collected products 50 are transported to the picking station 14 for being transferred there into the target container (with a one-stage picking process), or for being sorted into the target containers (with a two-stage picking process).

Finally, a query can be made (optionally) in step S38 whether further products 50 from previously unfinished picking orders exist. If further products 50 exist, the method 100 returns to the step S10—otherwise the method 100 ends.

It is understood that alternatively each the corresponding transport and transferring steps may also be planned in advance already.

Figure 6:
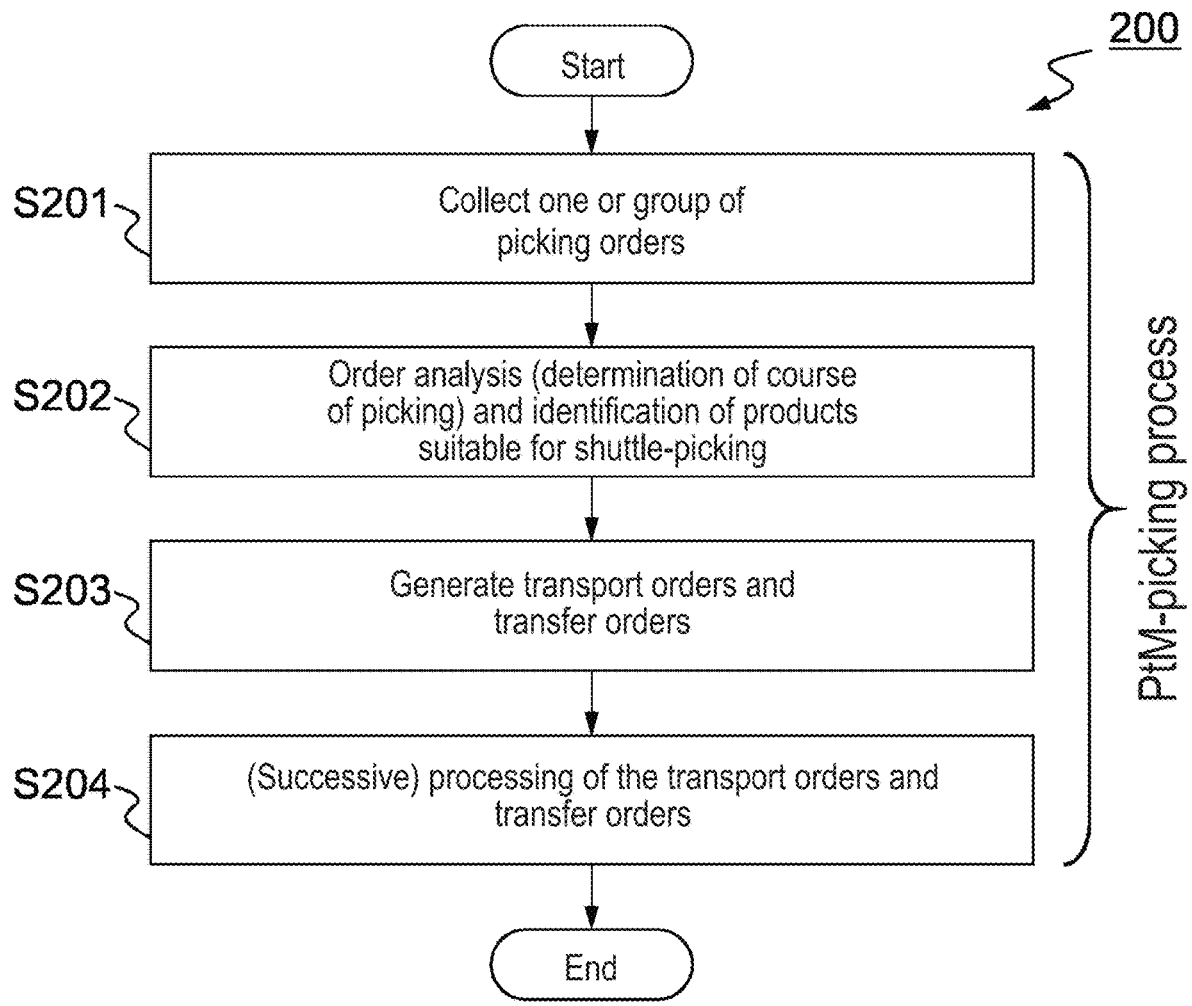
FIG. 6 shows a flow chart of a picking method operated in accordance with the Product-to-Man/Machine-principle.
Figure 7:
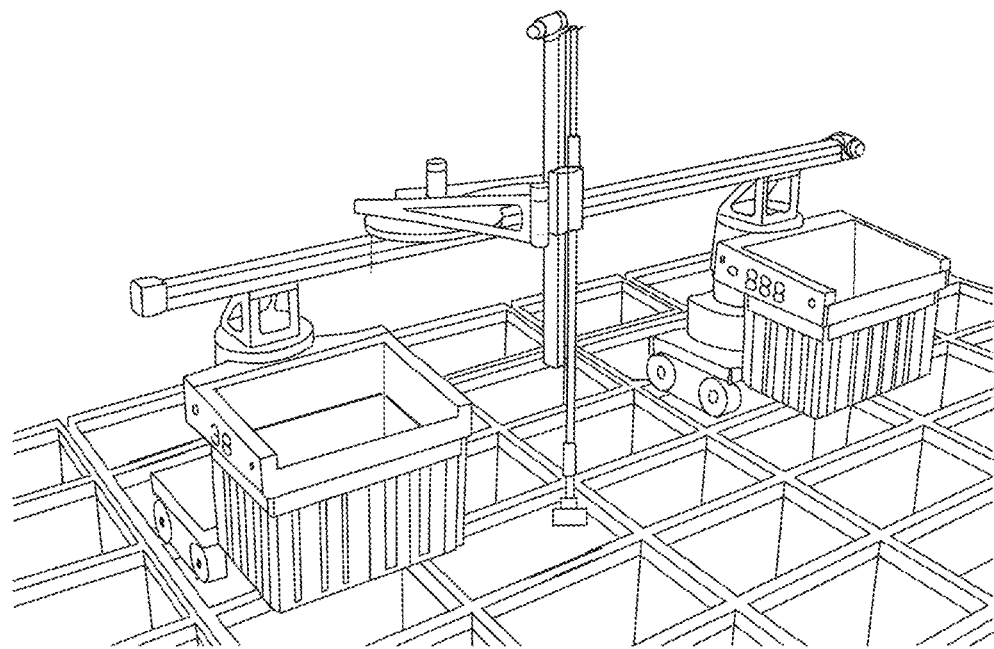
FIG. 7 shows a perspective view of shuttles cooperating with each other, in a conventional Autostore™-storage concept.
Figure 8:
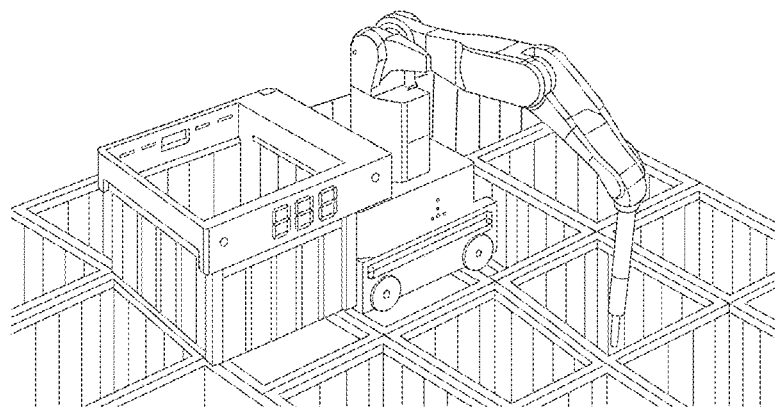
FIG. 8 shows a perspective view of a shuttle, which acts alone, in the conventional Autostore™-storage concept.
Figure 9:
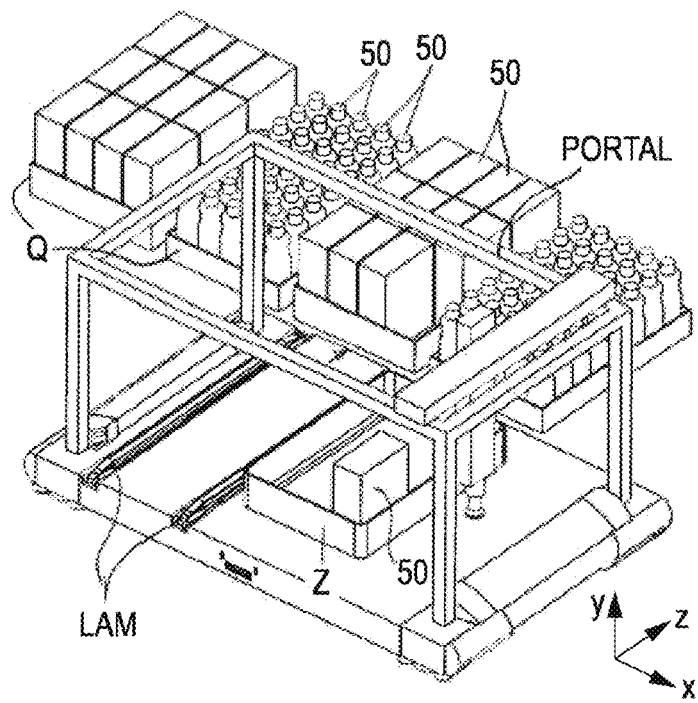
FIG. 9 shows a perspective view of a conventional shuttle having a gantry-gripping unit of three axes.
Figure 10:
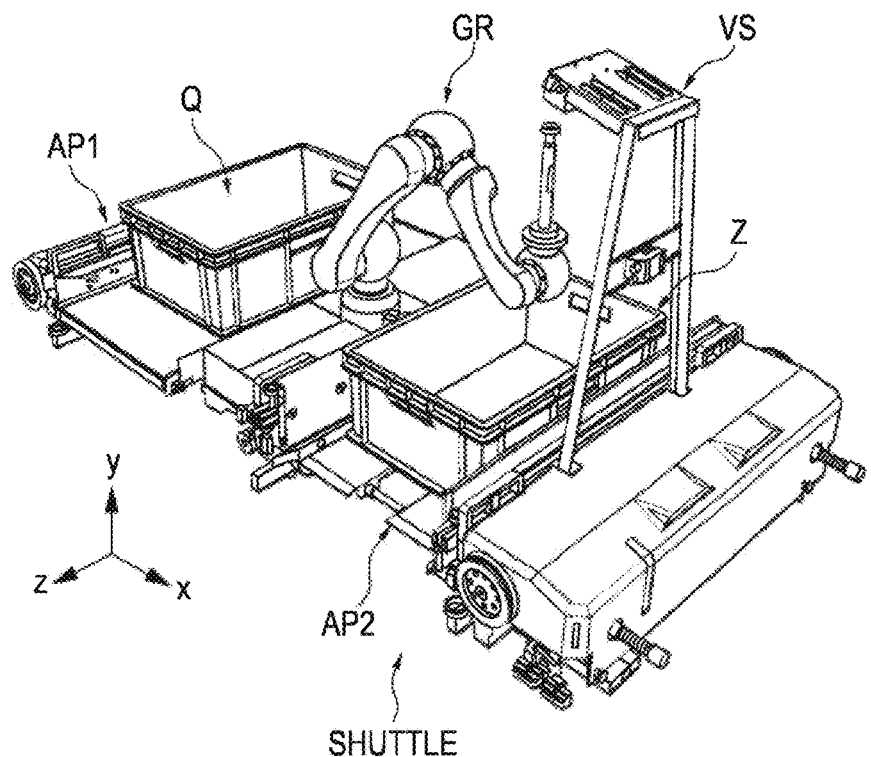
FIG. 10 shows a perspective view of a known picking shuttle including a six-axis manipulator, two receiving locations, and a vision system.

The method 100 of FIG. 5 preferably is part of a more general picking process 200, a flow chart of which is illustrated in FIG. 6.

The more general picking process 200 includes several method steps. In a first method step S201 one or more picking orders are collected. If several picking orders are collected, in the following one speaks also of a group of picking orders.

In step S202 the collected orders are analyzed. The order analysis is performed by the controlling device 22, and in particular by the order-processing computer 28. In particular, course of picking is determined upon the order analysis. For example, it is determined whether it is picked in one stage or in two stages in the storage and picking system 10 of FIG. 1. Mixed operation of one-stage picking and a two-stage picking is also possible. Since the storage and picking system 10 of FIG. 1 is operated in accordance with the PtM-principle, it can be additionally determined during the order analysis whether it is picked in parallel. With parallel picking, source containers 48, which are preferably filled with products of one type only, are transported to the picking station 14 for filling more target containers at the same time, which are positioned on corresponding buffer locations in the picking station 14. In this case, the retrieval of the source containers 48 is performed in an article-oriented manner and the filling of the target containers in an order-oriented manner.

The order analysis represents an optimization method. In the order analysis, an order is determined, for example, within which the collected picking orders are processed. If a type of product is stored at several different rack-storage locations 46, the corresponding rack-storage locations 46 are determined and a, for example path-optimized, candidate is selected therefrom, which has the shortest transport path from the rack-storage location 46 to the picking station 14. In a similar manner, shuttles 34 in the shuttle-rack storage system 30 and further conveyor-system elements of the conveyor system 16 outside the rack-storage block 32 are determined and selected considering optimization aspects (time, path, product distribution within the assortment, etc.).

The order analysis can also comprise a classification of the products 50 with regard to access frequencies. In particular, the order analysis can identify the above-mentioned products 50 suitable for shuttle-picking, which are used in the query of the step S10 of the method 100 in FIG. 5. Dependent on the previously determined and set parameters, such as a processing sequence of the collected picking orders, consideration of preset access frequencies, and the like, certain types of products from the collected picking orders are classified as products 50 suitable for shuttle-picking. For simplification of the following description, exemplary products 50 having a low access frequency (C-products) are identified as suitable for shuttle-picking. The products 50 having a low access frequency are "burdening" the material flow, because the corresponding source container 48 occasionally need to pass very long transport paths from the rack-storage block 32 to the picking station 14, in order to be retrieved in a small number at the location of the picking station 14. While the corresponding source container 48 is moved through the conveyor system 16 to the picking station 14, no other source container 48 can be moved to the picking station 14, which comprises a product 50 having a higher access frequency. Therefore, it is advantageous to pick this C-product 50 directly within the rack-storage block 32 by means of the shuttles 34, as it was already explained above in the example of FIGS. 3 and 4. In this case, the corresponding source container 48 do not leave the rack-storage block 32.

In this case the C-products 50 are picked preferably by the shuttles 34, if the corresponding shuttles 34 are not occupied with other transport orders (e.g. for A-products 50 and B-products 50). With other words, the shuttles 34, which were otherwise in a downtime state, or sleep state, are used for picking the C-products 50 within the rack aisle 42. In particular, this means that the shuttles 34, which are in the downtime state, may pick the to-be-picked-products 50 also independently of the access frequency thereof immediately, or earlier, in the aisle 42. For example, two shuttles 34 having no current transport order (for supplying the external picking station 14) may be used, in order to pick an A-product 50 or B-product 50 contained in one of the picking orders earlier within the aisle 42.

Also in this manner the (source-container) traffic density can be reduced in the conveyor system 16 arranged outside the rack warehouse 32. Thus, the capacity of the conveyor system 16 for transport of products 50 having a higher access frequency is increased. This in turn results in an increased overall picking performance (completed picking orders/unit of time).

It is understood that the identification of a product 50 "suitable for shuttle-picking" can depend simultaneously on many of the previously discussed parameters and can be different from picking order to picking order.

The picking method described in FIG. 5 allows a mixed picking operation. For example, the A-products and B-products are still processed in accordance with the PtM-principle of FIG. 6 in the picking station 14. Within the rack-storage block 32, the picking process is performed automatically by cooperation of several ones of the shuttles 34 of FIG. 5, in particular in accordance with the MtP-principle, if the product 50 collected in the collecting container 52 do not need to be merged with further products 50 in the picking station 14. Otherwise, pre-picking is performed in accordance with the MtP-principle in the rack-storage block 32, and then the final picking is performed in accordance with the PtM-principle in the picking station 14.

Returning to FIG. 6, after the order analysis in accordance with the step S202, in step S203 corresponding transport orders are generated, in particular by the material-flow computer 24, and transfer orders are generated, in particular by the order-processing computer 28. The transport orders and transfer orders are based on one or more picking orders.

Then, in step S204, the transport orders and transfer orders of the step S203 are (successively) processed, in particular in accordance with the method illustrated in FIG. 5. The processing of the step S204 can comprise—in mixed operation—the steps S10 to S38 of the method 100 of FIG. 5.

The steps S203 and S204 are partially matching to the special steps of FIG. 5.

The method 200 of FIG. 6 ends if each of the picking orders is completed. In this case, all of the products 50 in accordance with the types and numbers according to the picking orders have been removed from the source containers 48 and delivered, e.g. transferred, to the target containers.

Thus, the method 200 exemplary illustrates a picking process in accordance with the PtM-principle in the storage and picking system 10 of FIG. 1, wherein the special shuttle-picking method 100 in accordance with FIG. 5 can be considered.

LIST OF REFERENCE NUMERALS

10 storage and picking system
12 storage
14 picking station
16 conveyor system
18 goods receipt
20 goods issue
22 control device
24 material-flow computer
26 warehouse-management computer
28 order-processing computer
30 shuttle-rack storage system
32 rack-storage block
34 shuttle
36 vertical conveyor
38 controlling module
40 rack row
42 rack aisle
44 rack level
46 rack-storage location
48 source container
50 product
51 rail
52 collecting container
54 gripping unit
56 drive
58 gripper/manipulator
60 camera system
62 compartment partition
64 base of 52
66 opening movement
68 end of 42
70 continuous conveyor
100 picking method (special)
200 picking method (general)

The invention claimed is:

1. A method for picking products, in accordance with a picking order, by shuttles cooperating with each other in a shuttle-rack storage system, which includes a rack-storage block and a plurality of shuttles movable in a force-guided manner on different rack levels in a rack aisle defined between two rack rows, wherein the method comprises:
   moving a first shuttle of the cooperating shuttles in a longitudinal direction of the rack-storage block along the rack aisle to a rack-storage location in a first rack level and subsequently retrieving a source container containing the product specified by the picking order from the rack-storage location onto the first shuttle;
   moving a second shuttle of the cooperating shuttles in and along the rack aisle at height of a higher second rack level over the previously lower positioned first shuttle so that a gripping unit, which is mounted on the second shuttle, can pick the product from the source container, which is meanwhile positioned on the first shuttle; and
   transferring the product from the retrieved source container into a collecting container by:
   removing the product from the retrieved source container, which is positioned on the first shuttle, by the gripping unit of the second shuttle, and
   delivering the removed product to the collecting container being positioned on one of the shuttles positioned lower than the second shuttle within the rack aisle, or
   being positioned, lower than the second shuttle, at an end of the rack aisle.

2. The method of claim 1, wherein the gripping unit is formed biaxial for removing and delivering the product exclusively due to movements in height direction and transverse direction of the rack-storage block, and wherein a movement proportion of the transferring step along the longitudinal direction is caused by moving of at least one of the first and second shuttles.

3. The method of claim 1, further comprising:
analyzing the at least one picking order for products suitable for shuttle-picking.

4. The method of claim 3, wherein the step of analyzing is performed based on at least one of the following parameters:
a respective access frequency of the products contained in the picking orders;
overlapping downtime phases of the first and second shuttles; and
a number of stages of the picking principle practiced.

5. The method of claim 3, wherein
the shuttle-rack storage system supplies a picking station outside the rack-storage block with source containers for picking in accordance with the PtM-principle, and
the products suitable for shuttle-picking are pre-picked, or finally picked, by the cooperating shuttles within the rack aisle at the same time.

6. The method of claim 5, wherein the picking of the products suitable for shuttle-picking is performed such that the supply of the picking station with source containers, which are retrieved from the rack-storage block, occurs trouble-free.

7. The method of claim 5, wherein the products suitable for shuttle-picking are products having a low access frequency.

8. The method of claim 1, wherein the step of delivering is a vertical dropping of the removed product.

9. The method of claim 1, wherein the product(s) delivered to the collecting container is/are transported to a picking station outside the rack-storage block.

10. The method of claim 9, wherein the product(s) delivered to the collecting container is/are transported to the picking station outside the rack-storage block in case of a two-stage picking.

11. The method of claim 1, wherein the collecting container, which is positioned on one of the shuttles, is either emptied or exchanged after each of the products determined by the picking order(s) have been delivered to the collecting container.

12. The method of claim 1, wherein the picking order belongs to a group of previously collected picking orders.

13. The method of claim 1, wherein, in the step of delivering the removed product to the collecting container being positioned on one of the shuttles, the one of the shuttles is the first shuttle.

14. A shuttle-rack storage system, comprising:
a rack-storage block including a rack aisle arranged between two rack rows; and
a plurality of shuttles, which cooperate with each other, including at least a first shuttle and a second shuttle, which are provided on different rack levels and are operated in the rack aisle;
wherein the first shuttle is operated at height of a first one of the rack levels;
wherein the second shuttle is operated at height of a second one of the rack levels being arranged higher than the first rack level; and
wherein at least the second shuttle is provided with a biaxial gripping unit configured to remove a product from a source container, which is positioned temporarily on the first shuttle, and deliver it to a collecting container being positioned lower than the second shuttle by lifting the product only vertically, by the gripping unit, and lowering it also vertically, if necessary, and displacing the removed product horizontally transverse to a longitudinal direction of the rack aisle.

15. The shuttle-rack storage system of claim 14, wherein at least some of the source containers comprise a compartment partition so that products in vertically oriented product stacks are storable at fixedly determined positions within the corresponding source containers.

16. The method of claim 15, wherein all of the source containers comprise a compartment partition.

17. The shuttle-rack storage system of claim 14, wherein each of the gripping units is provided with a vision system.

18. The shuttle-rack storage system of claim 14, wherein each of the gripping units is positioned and attached to an end portion, which is located in the longitudinal direction, of the corresponding shuttle such that a respective shuttle height without any loaded source container is less than with a loaded source container.

19. The shuttle-rack storage system of claim 14, configured to carry out a method comprising:
moving a first shuttle of the cooperating shuttles in a longitudinal direction of the rack-storage block along the rack aisle to a rack-storage location in a first rack level and subsequently retrieving a source container containing the product specified by the picking order from the rack-storage location onto the first shuttle;
moving a second shuttle of the cooperating shuttles in and along the rack aisle at height of a higher second rack level over the previously lower positioned first shuttle so that a gripping unit, which is mounted on the second shuttle, can pick the product from the source container, which is meanwhile positioned on the first shuttle; and
transferring the product from the retrieved source container into a collecting container by:
removing the product from the retrieved source container, which is positioned on the first shuttle, by means of the gripping unit of the second shuttle; and
delivering the removed product to the collecting container being positioned on one of the shuttles, positioned lower than the second shuttle within the rack aisle or being positioned, lower than the second shuttle, at an end of the rack aisle.

20. The method of claim 14, wherein the second shuttle is operated at the height of the second one of the rack levels being arranged higher and directly over, the first rack level.

21. The method of claim 14, wherein each of the shuttles is provided with a biaxial grip-ping unit.

22. A storage and picking system including a controlling device and a shuttle-rack storage system comprising:
a rack-storage block including a rack aisle arranged between two rack rows; and
a plurality of shuttles, which cooperate with each other, including at least a first shuttle and a second shuttle, which are provided on different rack levels and are operated in the rack aisle;
wherein the first shuttle is operated at height of a first one of the rack levels;
wherein the second shuttle is operated at height of a second one of the rack levels being arranged higher than the first rack level; and
wherein at least the second shuttle is provided with a biaxial gripping unit configured to remove a product from a source container, which is positioned temporarily on the first shuttle, and deliver it to a collecting container being positioned low-er than the second shuttle by lifting the product only vertically, by the gripping unit, and lowering it also vertically, if necessary, and displacing the removed product horizontally transverse to a longitudinal direction of the rack aisle.

* * * * *